(12) United States Patent
Wu et al.

(10) Patent No.: US 7,830,744 B2
(45) Date of Patent: Nov. 9, 2010

(54) METHOD FOR DETERMINING RESERVOIR PERMEABILITY FORM BOREHOLE STONELEY-WAVE ATTENUATION USING BIOT'S POROELASTIC THEORY

(75) Inventors: Xianyun Wu, Sugar Land, TX (US); Hezhu Yin, Sugar Land, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 392 days.

(21) Appl. No.: 11/921,915

(22) PCT Filed: Jun. 6, 2006

(86) PCT No.: PCT/US2006/021798
§ 371 (c)(1),
(2), (4) Date: Dec. 10, 2007

(87) PCT Pub. No.: WO2007/001746
PCT Pub. Date: Jan. 4, 2007

(65) Prior Publication Data
US 2009/0145600 A1    Jun. 11, 2009

Related U.S. Application Data

(60) Provisional application No. 60/693,997, filed on Jun. 24, 2005.

(51) Int. Cl.
G01V 1/28    (2006.01)
G01V 1/30    (2006.01)
(52) U.S. Cl. .................................... 367/31; 367/32
(58) Field of Classification Search ............ 367/31, 367/32, 35
See application file for complete search history.

(56) References Cited

U.S. PATENT DOCUMENTS

| | | | | |
|---|---|---|---|---|
| 4,432,077 A | * | 2/1984 | Alhilali et al. | 367/31 |
| 4,797,859 A | | 1/1989 | Hornby | 367/31 |
| 4,964,101 A | | 10/1990 | Liu et al. | 367/31 |
| 5,616,840 A | | 4/1997 | Tang | 73/152.05 |
| 5,687,138 A | * | 11/1997 | Kimball et al. | 367/31 |
| 5,784,333 A | | 7/1998 | Tang et al. | 367/30 |
| 5,841,280 A | | 11/1998 | Yu et al. | 324/323 |
| 5,999,484 A | | 12/1999 | Kimball et al. | 367/31 |
| 6,327,538 B1 | | 12/2001 | Chin | 702/18 |

(Continued)

OTHER PUBLICATIONS

Biot, M. A. (1956) "Theory of Propagation of Elastic Waves in a Fluid-Saturated Porous Solid. I. Low-Frequency Range," *Jornl. of Acoustical Soc. of Amer.*, v.28.2, Mar. 1956, pp. 168-178.

(Continued)

*Primary Examiner*—Ian J Lobo

(57) ABSTRACT

Method for determining reservoir permeability from Stoneley wave attenuation extracted from conventional sonic logs by inversion of the full Biot wave equations for a porous medium. Frequency-dependent Stoneley-wave attenuation is extracted by analyzing array sonic measurements. Then, based on Biot's full theory applied to a borehole model and the standard logs (gamma ray, caliper, density, neutron, resistivity, sonic, etc.), a simulation model with the same parameters as the Stoneley-wave measurements is built. Next, a theoretical Stoneley-wave attenuation is computed for a given permeability. Finally, reservoir permeability is determined by comparing the modeled Stoneley-wave attenuation with the measured Stoneley-wave attenuation by an iterative inversion process.

15 Claims, 6 Drawing Sheets

U.S. PATENT DOCUMENTS

| | | | |
|---|---|---|---|
| 6,415,648 | B1* | 7/2002 | Peeters .......................... 73/38 |
| 2005/0065730 | A1* | 3/2005 | Sinha ........................... 702/7 |
| 2005/0149267 | A1* | 7/2005 | Van Den Beukel et al. .... 702/14 |

OTHER PUBLICATIONS

Burns, D. R. et al. (1986) "Determination of In-Situ Permeability From Tube Wave Velocity and Attenuation," *SPWLA 27th Annual Logging Symposium*, Paper KK, 16 pages.

Cassell, B. et al. (1994) "Permeability Prediction Based on Anelastic Attenuation Using Dipole and Low Frequency Monopole Sources in a Carbonate Reservoir in Saudi Arabia," presented at the *CEO-94 Middle East Geoscience Exhibition & Conference*, Bahrain, Apr. 25-27, 11 pages.

Gassmann, F. (1951) "On Elasticity of Porous Media," *Vierteljahrsschr. Naturforsch. Ges.*, Zurich, 96, version translated in 1998, 21 pages.

Hsui, A. T. et al. (1985) "Tube Wave Attenuation and In-Situ Permeability," the *SPWLA 26th Annual Logging Symposium*, Paper CC, 12 pages.

Kimball, et al. (1986) "Semblance of Processing of Borehole Acoustic Array Data," *Geophysics*, v.49, pp. 274-281.

Liu, H.-L. et al. (1997) "Effects of an Elastic Membrane on Tube Waves in Permeable Formations," *J. Acoust. Soc. Am.* v.101, pp. 3322-3329.

Norris (1990) "Stonely-Wave Attenuation and Dispersion in Permeable Formations," *Geophysics*, v.59, pp. 330-341.

Rosenbaum, J. (1974) "Synthetic Microseismograms: Logging in a Porous Formation," *Geophysics* v.39.1, pp. 14-32.

Schmitt, D. P. (1988) "Effects of Radial Layering When Logging in Saturated Porous Formations," *J. Acoust. Soc. Am.* v.84.6, pp. 2200-2214.

Tang, X.M. et al. (1991) "Dynamic Permeability and Borehole Stoneley-Waves: A Simplified Biot-Rosenbaum Model," *J. Acoust. Soc. Am.* v.90.3, pp. 1632-1646.

Tang, X. (2003) Determining Formation Shear-Wave Transverse Isotropy From Borehole Stoneley-Wave Measurements, *Geophysics*, v.68.1, pp. 118-126.

Tang, X. M. et al. (2004) *Quantitative Borehole Acoustic Methods*, Elsevier, p. 150.

White, (1983) "Underground Sound: Application of Seismic Waves," *Methods in Geochemistry and Geophysics*, Elsevier, Amsterdam, pp. 151-154.

Cheng et al. (1987) "Effects of in-situ permeability on propagation of Stoneley waves in a borehole", *Geophysics* 52, pp. 1279-1289.

Cheng, et al. (1982) "Determination of In Situ Attenuation from Full Waveform Acoustic Logs," *J. Geophy. Res.*, v. 87, pp. 5477-5484.

Hsui et al. (1986) "Application of an Acoustic Model to Determine In-Situ Permeability of a Borehole," *J. Acoust. Soc. Am.* 70, Jun. 1986.

Johnson, D. L. (1998) "Nonlinear Pulse Propagation in Arbitrarily Dispersive Media: Tube Waves in Permeable Formations," *J. Acoust. Soc. Am.*, 105(6), Jun. 1999, pp. 3087-3096.

Schmitt, D. et al. (1988) "Full-Wave Synthetic Acoustic Logs in Radially Semiinfinite Saturated Porous Media," *Geophysics*, 53(6), pp. 807-823.

Tang et al. (1996) "Fast Inversion of Formation Permeability from Stoneley Wave Logs Using a Simplified Biot-Rosenbaum Model," *Geophysics*, May-Jun. 1996.

Winkler, et al., (1989) "Permeability and borehole Stoneley waves: Comparison between experiment and theory," *Geophysics* 54, pp. 66-75.

EP Search Report No. RS 112971US dated Feb. 1, 2006, 2 pages.

\* cited by examiner

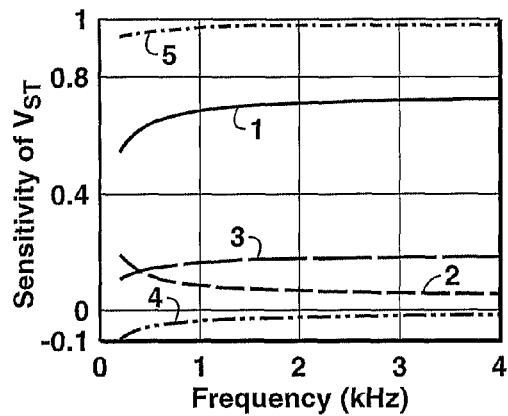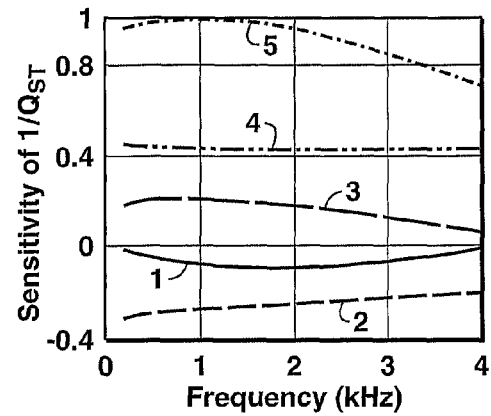
FIG. 1a  FIG. 1b
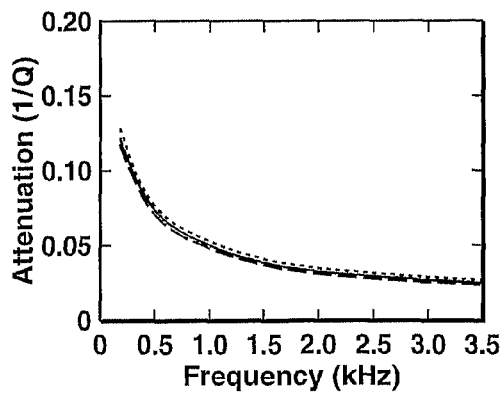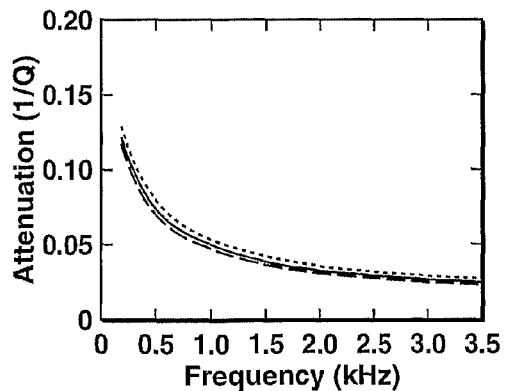
FIG. 2a  FIG. 2b

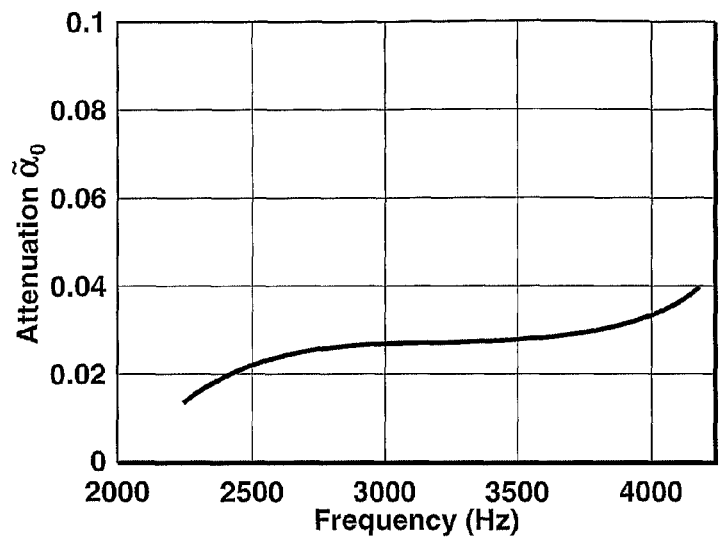
FIG. 8
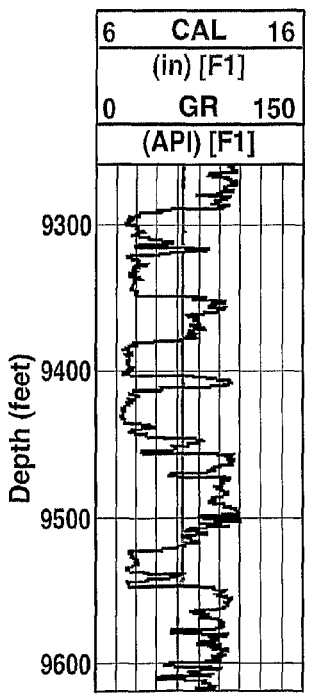 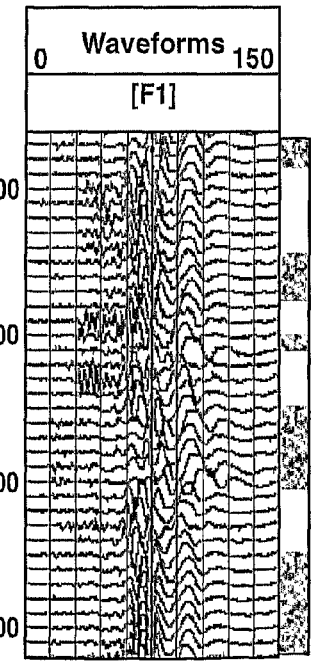 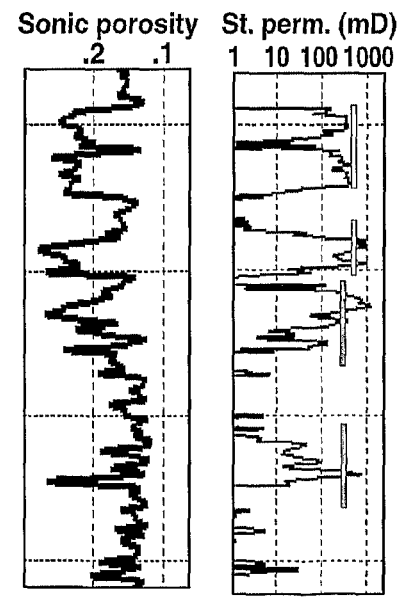
FIG. 9a  FIG. 9b  FIG. 9c  FIG. 9d

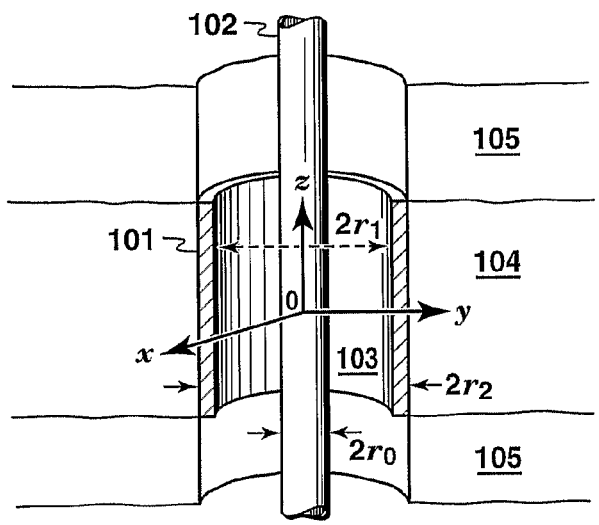
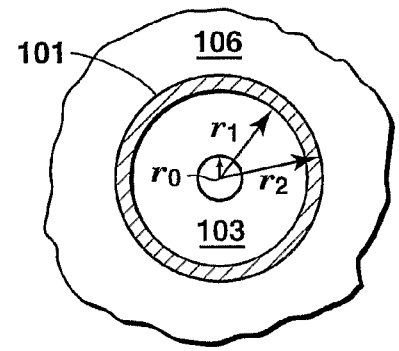
FIG. 10a
FIG. 10b
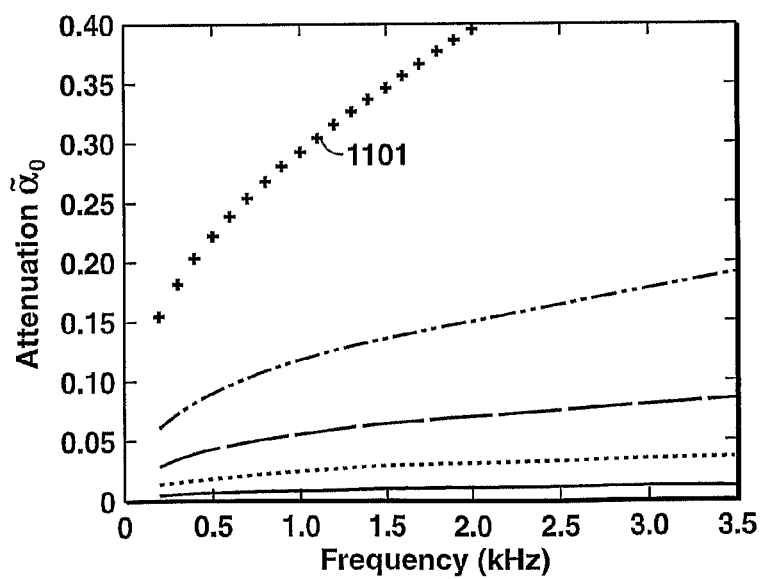
FIG. 11

METHOD FOR DETERMINING RESERVOIR PERMEABILITY FORM BOREHOLE STONELEY-WAVE ATTENUATION USING BIOT'S POROELASTIC THEORY

This application claims the benefit of U.S. Provisional Patent Application No. 60/693,997 filed on Jun. 24, 2005.

FIELD OF THE INVENTION

The present invention relates generally to the field of geophysical prospecting and, more particularly, to prediction of reservoir permeability. Specifically, the invention is a method for using Stoneley-wave attenuation extracted from conventional array sonic measurements to invert reservoir permeability.

BACKGROUND OF THE INVENTION

A sonic-logging tool called a sonde is commonly lowered into wellbores to generate and detect acoustic waves from which useful information is derived. A series of wave arrivals is detected by the tool after pulse initiation. The arrival times are proportional to the inverse of the wave velocity. The first arrival usually results from P-waves traveling in the formation penetrated by the wellbore. A P-wave is a longitudinal or compression wave, particle motion being in the direction of wave propagation. A second arrival in a typical sonic log is sometimes identified as S-wave travel in the formation. (Sheriff, *Encyclopedic Dictionary of Exploration Geophysics*, Society of Exploration Geophysicists ($4^{th}$ Ed., 2002)) An S-wave, or shear wave, has particle motion perpendicular to the direction of propagation. Following the S-wave is the Stoneley wave, a name given to surface waves in a borehole. In slow or soft formations where there is no S-wave, the Stoneley wave will be the second arrival in the sonic log. In general, Stoneley waves exhibit high amplitude and low frequency. Stoneley waves are usually distinct and readily identifiable arrivals in a sonic log.

The idea of using the Stoneley wave to predict reservoir permeability was proposed many years ago and thought to be a promising approach (Burns and Cheng, 1986; Cheng, et al., 1987). Stoneley wave measurements are the only data derived from sonic logs that are sensitive to permeability. P and S-waves are insensitive to permeability of the media through which they propagate. However, the applications of the existing Stoneley-wave permeability methods have had practicality issues. Their shortcomings include: 1) the inversion models are less sensitive to formation permeability; 2) practically, mud velocity is known only with large uncertainty, which can totally alter the relationship between Stoneley-wave velocity and permeability; 3) the effect of a mud cake on Stoneley-wave velocity cannot be separated from the effect of permeability, and a simultaneous multi-parameter inversion (permeability and mud cake property) will be non-unique; and 4) the use of either a low-frequency approximation or a simplified model is limited to low-frequency (~1 kHz) Stoneley-wave measurements, while in most cases Stoneley wave energy is located at 1-5 kHz or even higher. Mud refers to an aqueous suspension called drilling mud pumped down through the drill pipe and up through the annular space between it and the walls of the wellbore in rotary drilling operations. The mud helps remove drill cuttings, prevent caving, seal off porous zones and hold back formation fluids. The mud cake is the mud residue deposited on the borehole wall as the mud loses moisture into porous, permeable formations. The mud cake retards further loss of moisture to the formation and thus tends to stabilize in thickness.

There appears to be no existing tool for readily measuring mud velocity, nor is there a standard approach disclosed in the literature for estimating mud velocity. Instead, a value of mud velocity is typically taken as known. While such assumed values may be close to actual, it is a finding of the present invention that even an uncertainty of 2%-3% in mud velocity may dramatically affect estimates of permeability based on Stoneley wave velocity or Stoneley wave amplitude, which are two currently used commercial techniques. The presence of a mud cake is a problem because it introduces further uncertainty in the mud velocity estimate and, in turn, in the deduced value of permeability. Some existing theories assume a hydraulic exchange between borehole fluid and formation pore fluid, an assumption that is negatively impacted by presence of a mudcake.

There have been a number of Stoneley-wave permeability methods developed. Hornby (1989) patented a method for determining the permeability using Stoneley-wave slowness (reciprocal of velocity). The slowness of a hypothetical Stoneley wave traveling in an elastic, non-permeable medium was computed based on an elastic borehole model. The computed Stoneley-wave slowness was subtracted from the measured Stoneley-wave slowness. The difference was used to determine formation permeability. The fundamental problems to this method are the limited change of Stoneley-wave slowness as a function of permeability change and the need of accurate mud velocity estimation, especially the latter factor because an error of 1% in mud velocity can lead to a permeability prediction error of up to 200%. Moreover, there is no single sonic tool designed to measure mud velocity in-situ, and hence, mud velocity cannot be estimated accurately in practice.

U.S. Pat. No. 4,964,101 to Liu et al. discloses a similar method. The difference is that the inversion model includes a mud cake compensated parameter to correct the measured Stoneley-wave slowness. The compensated parameter has an equivalent effect on Stoneley-wave slowness as permeability. However, such a compensated parameter cannot be measured and must be included in the inversion model as an unknown as well. Determining two unknowns simultaneously from a single Stoneley-wave slowness measurement will certainly yield non-uniqueness.

Tang et al. (1998) developed a method using Stoneley-wave central time shift and the corresponding wave central frequency shift to determine formation permeability. Generally, an attenuation of $1/Q_{ST}$ will cause a shift of wave central frequency down to lower frequency. Such a central frequency shift is due to the total attenuation but not uniquely related to the attenuation due to formation permeability. The attenuation (1/QST) due to formation permeability is independent of the propagation distance. The central frequency shift is propagation distance dependent. Moreover, wave central frequency is closely related to the spectrum of the transducer. An exact estimation of wave central frequency shift can only be possible when the spectrum of the source is exactly known. Otherwise, the calculated wave central frequency shift will not correlate with permeability.

The existing published Stoneley-wave permeability methods mainly use Stoneley-wave slowness. These methods are known to suffer from low sensitivity to permeability and the effect of large uncertainty in mud velocity estimation. Those are the major reasons why the Stoneley-wave velocity permeability techniques have enjoyed limited success.

No published work has been found that discloses directly using Stoneley-wave attenuation ($1/Q_{ST}$) to determine permeability. Cassell, et al. (1994) presents a method of using Stoneley-wave attenuation to predict formation permeability for carbonate based on an empirical relationship between Stoneley-wave attenuation and permeability. Chin (2001) developed a method using the total waveform energy (attenuation-related) to predict permeability based on an empirical relationship between waveform energy and permeability. Tang and Cheng (1996) developed a method of using Stoneley-wave amplitude to predict permeability based on the simplified Biot-Rosenbaum model.

For the foregoing reasons, there is a need for a more accurate permeability estimation, in particular, for the frequent cases where the mud velocity cannot be estimated accurately. The present invention satisfies this need by providing a method for directly using frequency-dependent Stoneley-wave attenuation $1/Q_{ST}$ with full Biot theory, instead of simplified versions of the theory, to determine permeability. Biot theory describes seismic wave propagation in porous media consisting of solid skeleton and pore fluid (gas, oil, or water) and allows geophysicists to directly relate the seismic wave field to formation permeability.

SUMMARY OF THE INVENTION

In one embodiment, the invention is a method for determining the permeability of a subsurface formation (e.g., a reservoir) from sonic log data and well log data obtained from a well penetrating the formation, comprising: (a) analyzing the sonic data to extract frequency-dependent Stoneley wave attenuation for a selected sonic log receiver array comprising at least two receivers located at different depths in the well; (b) constructing a mathematical borehole model for the well; (c) programming a computer to solve wave motion equations for acoustic wave propagation from the selected sonic log source location to the receiver location, said wave equations representing a central mud region surrounded by the permeable formation with an annular mud cake region in between where and if mud cake exists; (d) determining boundary conditions from the borehole model; (e) obtaining all constants and parameters for the wave equations from the borehole model and the well log data or by otherwise estimating, except for the formation's permeability; (f) assuming a value for formation permeability $\kappa$; (g) solving the wave equations to obtain a solution corresponding to a Stoneley wave; (h) extracting from the solution a theoretical Stoneley wave attenuation as a function of frequency for the assumed value of formation permeability; (i) obtaining experimental Stoneley wave attenuation as a function of frequency from the sonic log data; (j) comparing theoretical Stoneley wave attenuation to experimental Stoneley wave attenuation; and (k) adjusting the assumed value of $\kappa$ and repeating steps (g), (h), (j) and (k) until theoretical and experimental Stoneley wave attenuation values agree according to a predetermined criterion, the corresponding value of $\kappa$ being a predicted value for formation permeability at a depth range corresponding to the interval covered by the selected receiver positions.

BRIEF DESCRIPTION OF THE DRAWINGS

The present invention and its advantages will be better understood by referring to the following detailed description and the attached drawings in which:

FIGS. 1a and 1b show sensitivity of Stoneley wave velocity (FIG. 1a) and attenuation (FIG. 1b) to mud velocity, borehole size, formation shear velocity and permeability as a function of frequency;

FIGS. 2a and 2b show the effects of uncertainty in mud velocity on Stoneley wave attenuation;

FIG. 8 shows Stoneley wave attenuation from the spectra in FIG. 7b;

FIG. 9d compares Stoneley wave attenuation permeabilities with well test results, with FIG. 9a showing gamma ray and caliper logs, FIG. 9b showing full waveforms, and FIG. 9c showing sonic porosity;

FIG. 10a illustrates a cross section of borehole geometry with mud cake and a sonic tool, and FIG. 10b illustrates a radial mathematical model of the borehole and surrounding formation; and FIG. 11 shows the behavior of the Stoneley wave attenuation factor with different permeabilities.

Figure 3A:
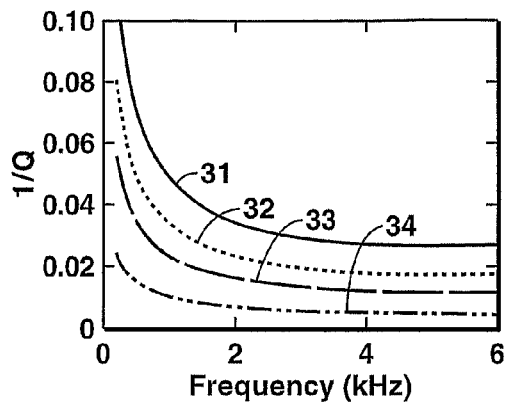
FIGS. 3a and 3b show the effects of formation permeability behind a hard mud cake (3a) and a soft mud cake (3b) on Stoneley wave attenuation.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present inventive method uses Stoneley-wave attenuation, or $1/Q_{ST}$ where $Q_{ST}$ is the frequency-dependent quality factor of the Stoneley wave, rather than Stoneley-wave velocity to determine permeability. It was discovered in the course of this invention that: 1) Stoneley-wave attenuation is much more sensitive to permeability than Stoneley-wave velocity, implying that the present inventive method can provide more accurate permeability estimation, 2) the present inventive method significantly reduces the effect of mud velocity uncertainty, 3) the effect of a mud cake on Stoneley-wave attenuation is much less than its effect on Stoneley-wave velocity, and 4) the present inventive method using full Biot theory can be used for, but is not limited to, low-frequency Stoneley-wave measurements. The new method also includes formation and borehole mud intrinsic attenuation correction so that it can be applied not only to consolidated, clean sands but also to unconsolidated and/or shaly sands.

In the present inventive method, frequency-dependent Stoneley-wave attenuation is extracted by analyzing array sonic measurements. Then, based on Biot's full theory applied to a borehole model and the standard logs (gamma ray, caliper, density, neutron, resistivity, sonic, etc.), a simulation model with the same parameters as the Stoneley-wave measurements is built. Next, a theoretical Stoneley-wave attenuation is computed for a given permeability. Finally, reservoir permeability is determined by comparing the modeled Stoneley-wave attenuation with the measured Stoneley-wave attenuation by an iterative inversion process.

Sensitivity to Permeability

Both Stoneley-wave velocity and attenuation are indeed correlated with formation permeability (see Cheng, et al., 1987). However, from the inverse problem point of view, the existence of certain correlation is only a necessary condition for determining permeability from Stoneley-wave measurements, but may not be a sufficient condition. It was found that Stoneley-wave attenuation is much more sensitive to permeability than Stoneley-wave velocity. FIGS. 1a and 1b show the sensitivity of Stoneley-wave velocity $V_{ST}$ and attenuation $1/Q_{ST}$, respectively, to borehole mud velocity 1, borehole size 2, formation shear velocity 3, and permeability 4. The sensitivity is defined as (Cheng, et al., 1982)

$$\frac{\beta}{A}\frac{\partial A}{\partial \beta}$$

where A denotes either $V_{ST}$ or $1/Q_{ST}$ (see Appendix), and $\beta$ can be any one of the model parameters. It may be noted that the sensitivity defined above could be any value because there is no normalization factor involved in the definition. Therefore, the total summation of the absolute sensitivity to all the model parameters (curve 5 in FIGS. 1a and 1b) is usually not unity. The maximum value of the total sensitivity in the frequency domain may be used to normalize the individual sensitivity for a certain parameter. It can be seen that Stoneley-wave velocity is most sensitive to borehole mud velocity, then to shear-wave velocity, then to borehole size, and least sensitive to formation permeability. On the other hand, Stoneley-wave attenuation is most sensitive to permeability, then to shear-wave velocity, borehole size, and borehole mud velocity in that order. The permeability used to generate FIGS. 1a and 1b is 1 Darcy, a relatively high permeability. For lower values of permeability, the absolute sensitivity of Stoneley-wave velocity to permeability will be even smaller. FIGS. 1a and 1b (and FIGS. 2a, 2b, 3a, 3b, and 4a-d as well) were generated by forward modeling using equations 33-35 in Appendix 2.

Effect of Mud Velocity

Due to the complexity of the Stoneley-wave propagation in the borehole geometry, besides formation permeability, a number of non-permeability parameters also affect Stoneley-wave propagation. For an inversion solution, the effect of uncertainty of the non-permeability parameters usually controls the accuracy of the resulting permeability prediction when using Stoneley-wave velocity based methods. Large uncertainties may result in an erroneous permeability value. It is demonstrated below that the uncertainty of mud velocity changes Stoneley-wave velocity significantly, but has minor effect on Stoneley-wave attenuation. In FIGS. 2a and 2b, which assume a formation permeability of 200 mD, the solid-line Stoneley wave attenuation curve is based on a mud velocity of 1.5 km/s. The dotted line curves assume a mud velocity 3% (FIG. 2a) and 4% (FIG. 2b) greater. The dashed line curves assume a mud velocity 3% (FIG. 2a) less than 1.5 km/s and 4% (FIG. 2b) less. The effect of an uncertainty of ±3% (FIG. 2a) or ±4% (FIG. 2b) in mud velocity on Stoneley-wave attenuation can be seen to be negligible. But the same mud velocity uncertainty will seriously contaminate the permeability effect, which makes the prediction of permeability from Stoneley-velocity very inaccurate. This is particularly important because mud velocity typically cannot be measured accurately. In fact, mud velocity is usually just estimated from measurements of the mineral components of the mud and using an approximate relationship for multi-phase media. Therefore, mud velocity estimates may have large uncertainty.

Effect of Mud Cake

Figure 3B:
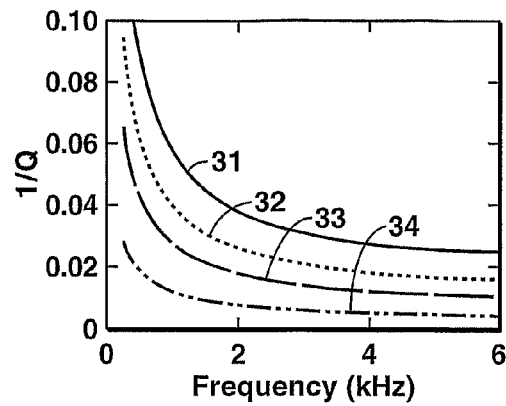

In the course of this invention, it was found that mud cake as an elastic annulus with the thickness less than one inch between borehole mud and permeable formation has negligible the effect on Stoneley-wave attenuation even for an annulus with a comparable rigidity to that of the formation. FIGS. 3a and 3b show the effects of formation permeability behind a hard mud cake (FIG. 3a) and a soft mud cake (FIG. 3b) on Stoneley-wave attenuation (1/Q). The hard mud cake is taken as having P-wave velocity $V_P$=2280 m/s and S-wave velocity $V_S$=1140 m/s, and density $\rho$=2 g/cm$^3$. The soft mud cake is taken as having $V_P$=1824 m/s, $V_S$=0.570 m/s, and $\rho$=1.75 g/cm$^3$. Mud cake thickness is 10 mm. Curves 31 are for a formation permeability of 200 mD; 32 for 100 mD; 33 for 50 mD; and 34 for 10 mD. FIGS. 3a and 3b are little different and in good agreement with cases without a mud cake, for example FIG. 2b. This result cannot be explained by the "Hydraulic Exchange Model" that has been considered to be the major mechanism of Stoneley-wave interaction with permeable formation (White, 1983). In terms of the physical properties of a mud cake (velocity and density), any kind of mud cake should be modeled with an elastic (not poro-elastic, i.e., not permeable) annulus with appropriate parameters. It follows that the borehole wall impedance model (Rosenbaum, 1974) and an elastic membrane model (Liu, 1990; 1997) appear to be unrealistic. Both Winkler (1989) and Tang (2004) observed that mud cake seems "strangely" not to affect Stoneley wave propagation in most cases. In this invention, the mud cake is modeled as an elastic annulus that means the mud cake is completely non-permeable, and hence there is no hydraulic exchange between the borehole fluid (mud) and pore fluid of the permeable formation.

Effect of Intrinsic Attenuation

Figure 4A:
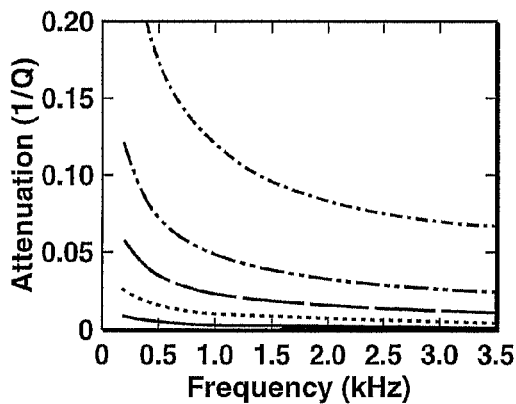
FIGS. 4a-d show effects of formation and mud intrinsic attenuation on Stoneley attenuation.
Figure 4B:
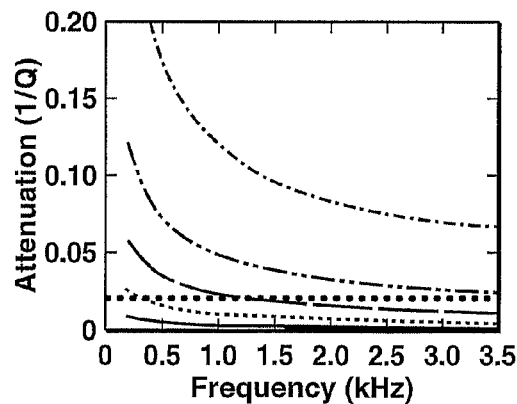
Figure 4C:
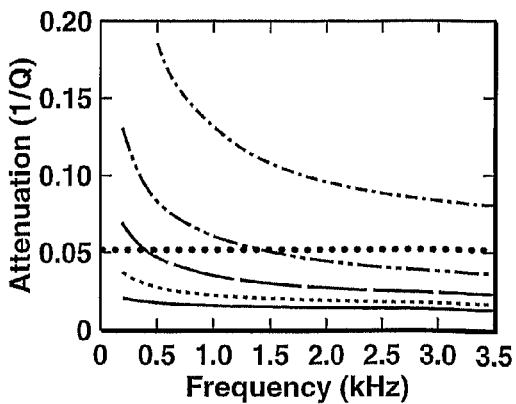
Figure 4D:
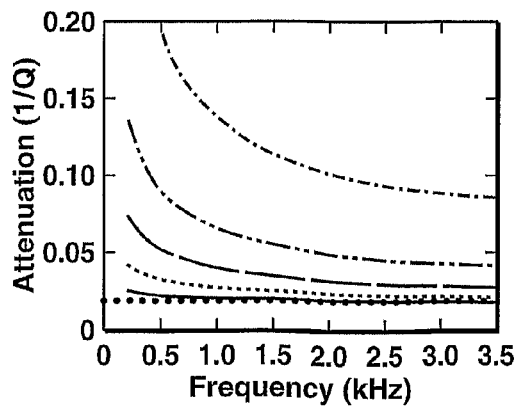

The intrinsic attenuation of borehole mud and formation directly affects Stoneley-wave attenuation (FIGS. 4a-d). In each of these four figures, the upper-most curve represents a permeability of 1000 mD, and, moving downward, the remaining curves represent permeabilities of 200 mD, 50 mD, 10 mD and 1 mD, in order. In FIG. 4a, both the formation matrix and the borehole mud are assumed elastic, with Stoneley wave attenuation introduced by permeability only. FIGS. 4b-d represent anelastic cases. FIGS. 4b and 4c assume a formation matrix shear-wave attenuation Q value of 50 (FIG. 4b) and 20 (FIG. 4c). In FIG. 4d, a mud attenuation Q of 50 is assumed. In most cases, the intrinsic attenuation of borehole mud is negligible, except for the case (not shown) where gas kicks into the mud and causes strong attenuation of the Stoneley wave. For that case, mud attenuation may be determined with the Stoneley waves in a non-permeable interval first, such as in the casing where Stoneley wave attenuation comes mainly from mud-intrinsic attenuation. Then, it may be assumed that the mud intrinsic attenuation for adjacent permeable intervals is similar. A person skilled in the field will know of other ways to determine mud intrinsic attenuation. As for formation intrinsic attenuation, it was found that only the formation shear-wave quality factor has a major effect on Stoneley-wave attenuation. In the present invention, all non-permeability related attenuation, including borehole size and shape, borehole mud and formation physical properties are accounted for in the intrinsic attenuation. Intrinsic attenuation inclusion improves the permeability prediction in shaly sands.

Figure 5:
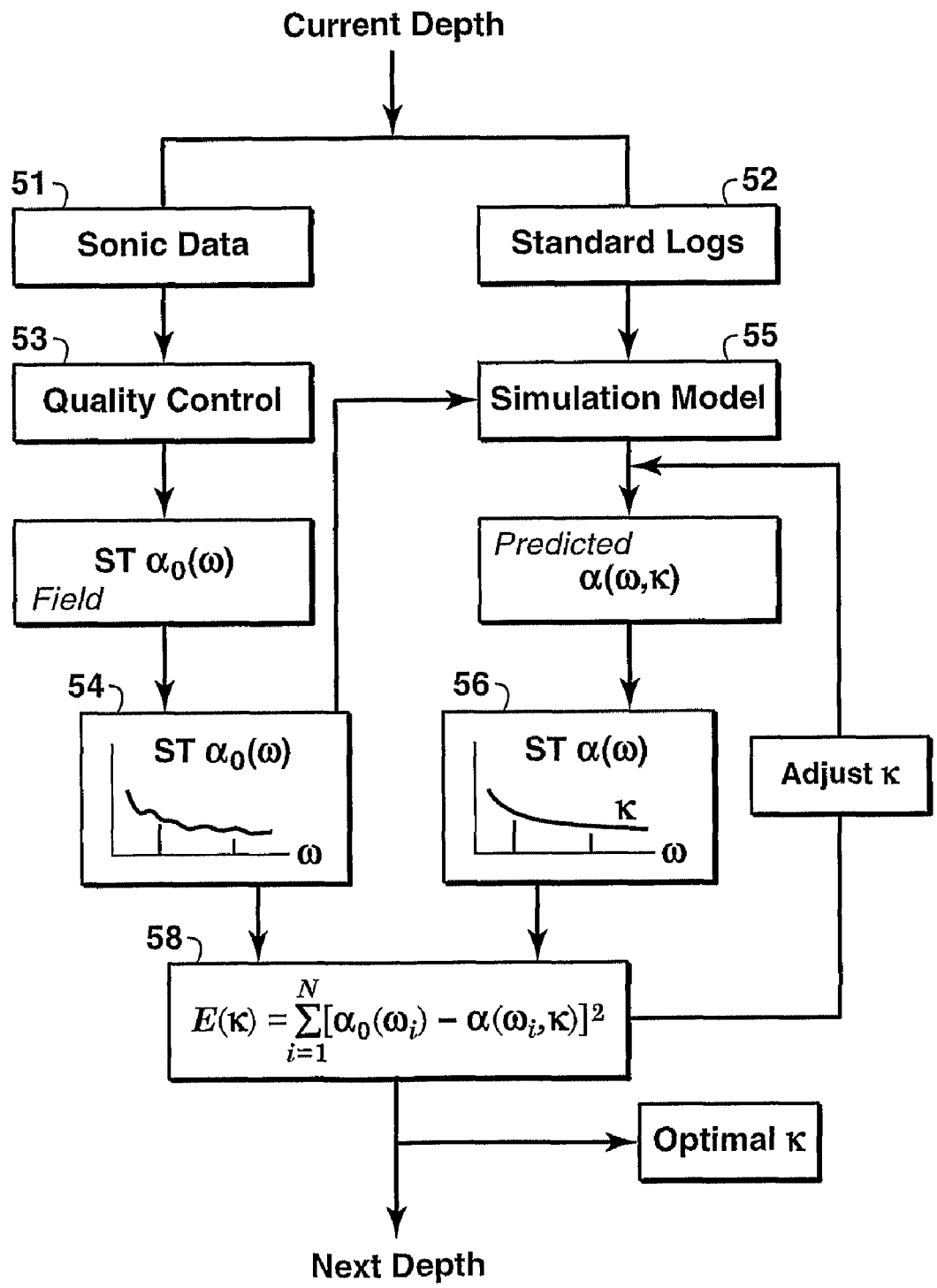
FIG. 5 is a flow chart of steps in one embodiment of the present inventive method.

FIG. 5 is a flowchart showing the primary steps of one embodiment of the present inventive method for inverting permeability from Stoneley array waveform data.

Input quantities are sonic data 51 (monopole and/or dipole waveforms) and standard logs 52 including gamma ray, caliper, density, neutron, resistivity, mud logs, or the like are input. The density log may be taken as formation overall density. Formation P and S-wave velocities can be estimated from the monopole and dipole waveforms, respectively. The grain (density and bulk modulus), the pore fluid properties, and porosity can be determined from the analysis of lithology by performing formation evaluation. With the extracted P and S-wave velocities, pore fluid, and porosity, the P and S-wave velocities of the rock matrix are determined using the Biot-Gassmann equation (Gassmann (1951)). Mud velocity data are usually not available. The Wood suspension system approximation (Wood (1941)) may be used to calculate mud velocity from the mud components measured on site. A person skilled in the art will know other methods to obtain mud velocity.

A quality control step 53 is often useful for dealing with noise in the sonic data. Quality control may include: Separating the backward propagation caused by borehole irregularities including borehole shape change from the forward propagation (Tang, 2004), filtering the full waveforms, and determining optimal time and frequency windows for Stoneley modes. Quality control may also be applied to the standard log data 52. Then, at step 54, the Stoneley-wave total attenuation $\alpha(\omega)$ is determined by fitting the spectra crossing receivers with $e^{-\alpha z_i}$ in frequency domain where $z_i$ is the distance between the first receiver to the $i^{th}$ receiver. Steps 51, 53 and 54 are explained in more detail in Appendix 1.

To synthesize Stoneley-wave attenuation with the same parameters of the formation where the receiver array is located, a forward simulation model 55 is needed. The full Biot model is discussed in detail in Appendix 2. The coefficients and parameters needed to solve the Biot equations (by numerical methods) are obtained mostly from the standard logs 52. With the standard logs typically including gamma ray, caliper, resistivity, density, neutron, sonic logs, and so on, the formation density, P and S-wave velocities, porosity, pore fluid properties, and borehole size can be determined. Then, using P and S-wave velocities, density, porosity, pore fluid bulk modulus and density, the bulk ($k_b$) and shear modulus ($\mu$) of the rock matrix can be derived.

Mud weight and its mineral components are usually available. Then, the Wood formula (Wood (1941)) may be used to estimate mud velocity. Mud intrinsic attenuation may be derived in a non-permeable clean-sand interval where Stoneley-wave attenuation is completely attributed to the contribution of mud intrinsic attenuation. If there is no gas bubble in the mud and the mud is of normal viscosity (~1 cp), mud intrinsic attenuation is negligible and one can let $1/Q_M=0$.

One can estimate formation intrinsic attenuation in a typical shale zone and building an empirical relationship between shear-wave quality factor and shale volume. In one embodiment of this invention, this relationship is taken to be $$1/Q_S = 1/Q_{MAX} \times 10^{1.545 V_{SH}}$$

where $V_{SH}$ is shale volume from gamma ray data and $1/Q_{MAX}$ is the attenuation of the rock matrix. For consolidated sands, $Q_{MAX}$ may be taken as 200. For unconsolidated sands, $Q_{MAX}$ may vary over a large range. Persons skilled in the art will know other ways to estimate intrinsic attenuation for a shale zone.

Mud cake thickness can be determined by comparing the caliper log with the bite size. One may use the same approach as used for mud velocity estimation to estimate mud cake properties. If the formation is invaded deeply (greater than ~12-24 inches) evidenced typically by a set of resistivity logs, the mud filtrate is preferably assumed to be the pore fluid in the simulation model.

In this manner, all parameters required by the Biot theory are determined except for permeability. Stoneley-wave attenuation at a user-specified value of permeability can be calculated for the frequencies of interest (which may be determined for the Stoneley wave from the sonic data) using the simulation model. The Newtonian iteration scheme or other fast method is useful to speed up the search of Stoneley roots of the periodic equation (Eqn. 33 in Appendix 2). The Stoneley roots are the values of wave number $k_{ST}$, which will be complex numbers, that are obtained by solving the periodic equation. The Stoneley wave attenuation is then calculated from Eqn. (35) of Appendix 2, i.e, $$\alpha(\omega, \kappa) = \frac{1}{Q_{ST}} = \frac{2\text{Im}(k_{ST})}{\text{Re}(k_{ST})}$$

In preferred embodiments of the invention, the iterative comparison of the calculated value $\alpha(\omega,\kappa)$ of Stoneley attenuation (56 in FIG. 5), based on an assumed value of formation permeability $\kappa$, to the $\alpha_0(\omega)$ obtained from the sonic data (54 in FIG. 5) is accomplished (step 58) by finding extrema of an objective function. The following expression is such an objective function:

$$E(\kappa) = \sum_{\omega_1}^{\omega_2} [\alpha_0(\omega_i) - \alpha(\omega_i, \kappa)]^2$$

where $E(\kappa)$ is the objective function with respect to permeability $\kappa$, $\alpha_0(\omega)$ is the measured Stoneley-wave attenuation and $\alpha(\omega,\kappa)$ is the theoretical Stoneley-wave attenuation for given permeability $\kappa$, $\omega_1$ and $\omega_2$ are the frequency range of interest, which is typically determined in the quality control step. A one-dimensional linear inverse algorithm may be used in the form of $$\kappa = \kappa_0 - \frac{E(\kappa_0)}{\left.\frac{\partial E(\kappa)}{\partial \kappa}\right|_{\kappa_0}}$$

where $\kappa = \kappa_0 - \frac{E(\kappa_0)}{\left.\frac{\partial E(\kappa)}{\partial \kappa}\right|_{\kappa_0}}$ is the initial guess of $\kappa$. Generally, about 3-5 iterations are needed to satisfy a typical convergence criterion $$\left|\frac{\kappa - \kappa_0}{\kappa_0}\right| < \varepsilon$$

where $\varepsilon$ is a preset small quantity. In this manner, a "best" value of permeability $\kappa$ may be arrived at.

By repeating the preceding steps for successive logging point/depths, the method will give a continuous permeability profile.

EXAMPLES

A "blind" test was conducted to predict permeability with Stoneley data, and then, compared with the well test results. The sonic data was acquired from an exploration well in West Africa.

Figure 6A:
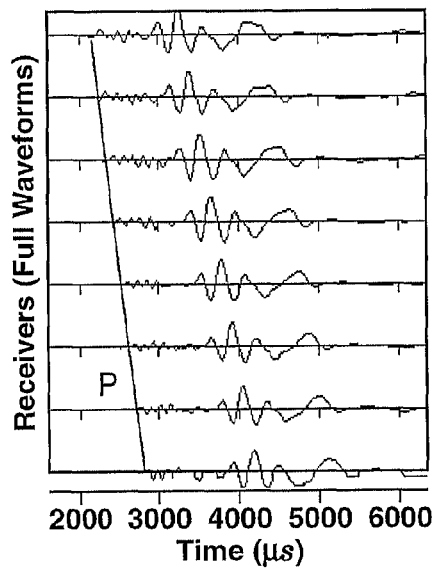
FIG. 6a shows monopole full waveforms in a sonic log.
Figure 6B:
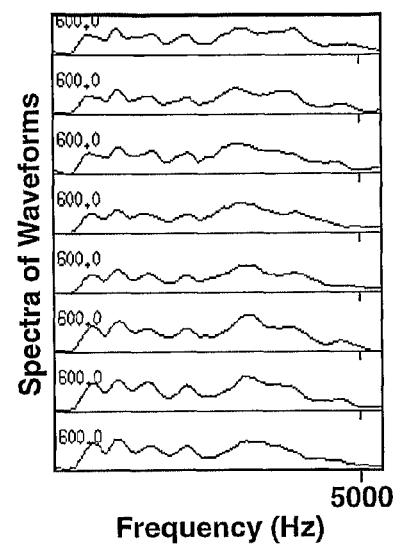
FIG. 6b shows the corresponding spectra of the waveforms.
Figure 7A:
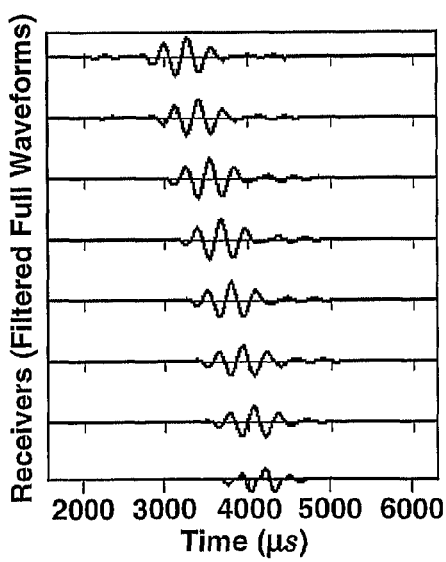
FIGS. 7a and 7b show the filtered full waveforms from FIG. 6a and the corresponding spectra, respectively.
Figure 7B:
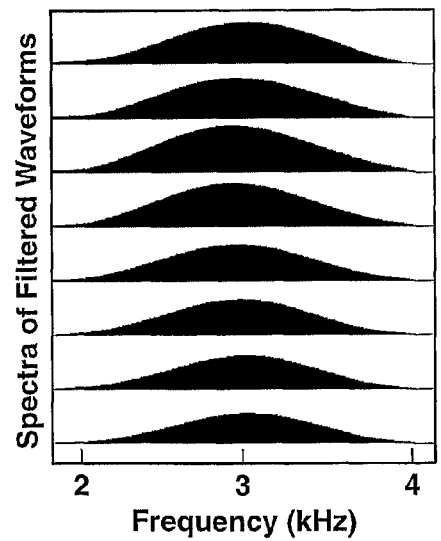

Well "A" was logged by a commercial sonic tool. The sonic data included wideband monopole and cross-dipole waveforms. Overall, the quality of sonic measurements is good, as evidenced by FIGS. 6a and 6b, which show the customary eight monopole full waveforms and the corresponding spectra at a given depth. High amplitude and low-frequency Stoneley waves are prominent. The entire wave energy is located at the low frequency range (<5 kHz). The events with even lower frequency and following the Stoneley waves are unclear, which may alter the spectra of Stoneley waves. A filter of 2-5 kHz was applied to make Stoneley waves clean (FIG. 7a). Then a time window of 1000 μs was used to pick up the Stoneley waves. FIG. 7b shows very nice spectra of Stoneley waves. The Stoneley-wave total attenuation $\tilde{\alpha}_0(\omega)$ is determined by fitting the spectra crossing receivers with $e^{-\tilde{\alpha}_0 z_i}$ in frequency domain where $z_i$ is the distance between the first receiver (relative to transducer) to the $i^{th}$ receiver (FIG. 8). To help the inversion to be of high vertical resolution, the first four traces were used to calculate Stoneley-wave attenuation.

Other available logs are gamma ray, caliper, resistivity, density, and neutron. The density log is used for overall formation density. The caliper log is used for borehole diameter. The straight caliper (FIG. 9a) indicates a good borehole condition. Integrated analysis of resistivity, density, and neutron logs illustrates an oil-bearing reservoir. Formation P and S-wave velocities are determined from the monopole and dipole waveforms, respectively. Intrinsic attenuation is estimated for shaly sand and shale intervals. Mud velocity was not available. From the daily operation report of this well, the mud components were reported and are shown in Table 1.

TABLE 1

| Mud components (%) | | | |
|---|---|---|---|
| oil | Water | solid | sand/other |
| 64 | 26 | 8.3 | 1.7 |

Salinity and weight of the mud are 35 kppm and 1.14 g/cm$^3$, respectively. Using the Wood's suspension model for a multi-phase suspension system, the bulk modulus of the mud can be estimated as $K_m$=2.126 GPa. Integrating mud weight, the estimated mud velocity is 1366 m/s. The modulus and size of the sonic tool used are 6.73 GPa and 0.045 m (Tang, 2003). The density and velocity of the pore fluid (oil) used are 0.8 g/cm$^3$ and 1410 m/s, respectively.

Generally, the viscosity of the pore fluid is an unknown too. In most cases, only a mobility of formation (ratio of permeability to viscosity) is inverted. Absolute permeability can be obtained only when the viscosity can be known accurately. In this example, a viscosity of 2 cp was assumed.

FIG. 9d shows a comparison between the inverted (present inventive method) permeability curve and the well test results (vertical bars). (A well test or conventional core is much more expensive to obtain than running a sonic log and extracting permeability from it by a method such as the present invention.) Stoneley-wave permeability is of a vertical resolution of about 2 ft, whereas the well tests only give the average permeabilities over the tested intervals, which are plotted as bars in FIG. 9d; the upper two bars represent a permeability of 640 mD, and the lower two bars represent 351 mD. It can be seen that there is excellent agreement between the inverted permeability and the well test results. FIG. 9b shows the full waveforms received by the first receiver, and FIG. 9c shows the sonic porosity as a function of depth (scale in meters).

The present invention can provide a continuous permeability profile from conventional sonic measurements. The application of the inventive method does not need any new tools. The raw data (Stoneley waveforms) are already contained in conventional sonic data. Therefore, Stoneley-wave permeability is an economic approach. The invention can be applied to, among other uses, borehole completion and hydrocarbon production; permeability input for reservoir simulation; and assessment of producibility.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

APPENDIX 1

Estimate of Stoneley-Wave Attenuation from Sonic Measurements

Modern sonic logging tools can acquire good quality monopole sonic data. Some of these tools can fire either at high frequency (8~30 kHz, P/S mode) or at low frequency (80 Hz~5 kHz, Stoneley mode). They can also fire as a cross-dipole mode (80 Hz~5 kHz). Other tools can fire at a wide frequency band (>1 kHz). Such tools are the major tools utilized for sonic logging service.

Generally, there are 8 waveforms for each depth. Eight waveforms have the same time length but could be different from well to well. To save disk spaces, the record time of each waveform starts usually within a certain time after source firing, which will be recorded in a file (Start time). Therefore, the absolute record time does not indicate the real time of a signal traveling from source to a receiver. The amplitude of each waveform is also modified by a factor (Gain factor) that is recorded in another file. The waveforms should be recovered before processing for velocity and attenuation.

It is convenient and useful to have P-wave events located first. Then P-wave events (starting point and velocity) can be used as a reference for subsequent processes. Since P-wave events usually have higher signal-to-noise ratio and are non-dispersive, the widely used slowness-time coherence method (Kimball, 1986) is very efficient for P-wave velocity. From the recovered waveforms, quality analysis is typically needed, including wave separation if necessary (Tang, 2004), signal-to-noise ratio estimation of Stoneley waves, evaluation of the spectra of Stoneley waves, filtering the data to enhance the signal-to-noise ratio of Stoneley waves, determining the optimal time window for Stoneley waves, and similar techniques. Finally, the fast Fourier transform (FFT) is a preferred method for obtaining the Stoneley wave spectrum for each receiver.

To reduce the effects of the source spectrum and the coupling between the source and receiver, the spectra of the waveforms from the second to eighth traces may be normalized by the spectrum of the Stoneley wave at the first receiver.

Since the Stoneley-wave is an interface mode, it has no geometry spreading. Therefore, it may be assumed that the Stoneley-wave amplitude versus distance can be expressed by $$A(\omega, z_i) = A(\omega, z_1) e^{-\tilde{\alpha}_0(\omega) z_i}$$

where $z_i$ is the distance between the $i^{th}$ receiver to the first receiver and $\tilde{\alpha}_0(\omega)$ is attenuation factor, which is frequency-dependent and distance-independent. Using the preceding equation, the effect of a rough borehole between transmitter and the first receiver is significantly depressed. Then, using a linear fitting algorithm, the Stoneley-wave attenuation factor $\tilde{\alpha}_0(\omega)$ can be derived as $$\tilde{\alpha}_0(\omega) = -\frac{\sum_{i=2}^{M} z_i \ln[A(\omega, z_i)/A(\omega, z_1)]}{\sum_{i=2}^{M} z_i^2}.$$

Again, $A(\omega, z_i)$ is the normalized spectrum of Stoneley wave at the $i^{th}$ receiver, and M is the number of the traces used to calculate the $\tilde{\alpha}_0(\omega)$. The $\tilde{\alpha}_0(\omega)$ will be calculated over a frequency range of interest. FIG. 11 shows the behavior of $\tilde{\alpha}_0(\omega)$ with different permeabilities (forward results). The top curve 1101 corresponds to a permeability of 1000 mD, and the remaining curves, moving downward on the graph, correspond to 200 mD, 50 mD, 10 mD and 1 mD, in order. At the same time, Stoneley-wave dispersion or $V_{ST}^0(\omega)$ can also be analyzed using the well known maximum likelihood method (Hsu and Baggeroer, 1986; Wu, et al. 1994).

It may be noted that the preceding equation for $\tilde{\alpha}_0(\omega)$ is different from $\alpha(\omega)$ defined by equation (35) in Appendix 2. The corresponding Stoneley-wave attenuation or $\alpha_0(\omega)$ can be obtained from $$\alpha_0(\omega) = \frac{1}{Q_{ST}^0(\omega)} = \frac{2\tilde{\alpha}_0(\omega) V_{ST}^0(\omega)}{\omega}$$

where $V_{ST}^0(\omega)$ is the experimental Stoneley wave velocity, which provides a measured Stoneley wave attenuation for the objective function of step 58 of FIG. 5. Although both $\tilde{\alpha}_0(\omega)$ and $V_{ST}^0(\omega)$ are highly mud velocity dependent, their mud velocity dependency cancels each other so that $\alpha_0(\omega)$ is not sensitive to mud velocity.

APPENDIX 2

Stoneley Attenuation Using Full Biot Poroelastic Theory

A Radially Layered Model

To model a realistic sonic logging configuration, a radially concentrically layered model is used. The sonic tool is modeled with an elastic bar with an effective bulk modulus $M_T$ and the same radius $r_0$ as the tool. The borehole mud is modeled with an anelastic fluid annulus with $V_M$, $\rho_M$, and $Q_M$ as its sound speed, density, and quality factor, respectively. The mud cake is modeled with an elastic annulus with $\alpha_{MC}^P$, $\beta_{MC}^S$ and $\rho_{MC}$ as its P and S-wave velocities and density, respectively. The inner and outer radii of the mud cake are $r_1$ and $r_2$. FIGS. 10a and 10b show the schematic diagram of a typical acoustic logging configuration. FIG. 10a shows the cross section of borehole geometry with mud cake 101, sonic tool 102, mud 103, sand reservoir 104, and adjacent beds 105. FIG. 10b shows the radial mathematical model with the formation region 106. The formation is modeled with a poroelastic media described by the modified Biot theory (Cheng, et al., 1987). Since the tool is assumed to be centered, only the 0th-order Bessel function is needed to describe the wave fields excited by a monopole source. The shear wave with horizontal polarization or SH wave cannot be emitted.

Wave Field in Mud and Tool Correction

Consider an acoustic wave propagating along a borehole containing a logging tool of radius $r_0$. The general solution of wavefield in the mud between the tool and formation can be expressed as $$\phi_1 = A_1 K_0(kr) + B_1 I_0(kr) \qquad (1)$$

where k is the radial wavenumber and r is the radial distance in a cylindrical coordinate system. $K_0$ and $I_0$ are the $0^{th}$-order modified Bessel function of the first and second kinds. $A_1$ and $B_1$ are amplitude coefficients. For simplicity, the wave propagation factor in z-axial direction or $e^{ik_z z}$ and the harmonic factor as time or $e^{i\omega t}$ are omitted, where $\omega$ is the angular frequency and $k_z = \sqrt{k^2 - \omega^2/V_m^2}$ is the axial wavenumber with $V_m$ as the mud velocity.

Using a quasi-static analysis, Norris (1990) derived a simple correction relation of the tool compliance $$\frac{A_1}{B_1} = \frac{(M_T/r_0)kI_1(kr_0) + \rho_m \omega^2 I_0(kr_0)}{(M_T/r_0)kI_1(kr_0) - \rho_m \omega^2 I_0(kr_0)} \qquad (2)$$

substituting eq. (2) into eq. (1), only one unknown coefficient needs to be determined from the boundary conditions.

The displacement and pressure of the fluid annulus can be expressed with $$U_{mr}^{(1)} = A_1 k K_1(kr) + B_1 k I_1(kr) \qquad (3)$$

and $$P_m^{(1)} = \rho_m \omega^2 [A_1 k K_1(kr) + B_1 k I_1(kr)] \qquad (4)$$

Wave Field in Mud Cake

The mud cake is assumed to be an elastic layer. The general solution of the compressional and shear potentials can be expressed by $$\phi_{mc}^{(2)} = A_2 K_0(kr) + B_2 I_0(kr) \qquad (5)$$

and $$\psi_{mc}^{(2)} = A_2 K_0(kr) + B_2 I_0(kr) \qquad (6)$$

Using the displacement-stress relation (Aki and Richards, 1980), the displacement and stress fields can be easily derived (not shown).

Wave Field in the Permeable Formation

In frequency domain and omitting the time harmonic factor of $e^{i\omega t}$, Biot's simultaneous equations can be expressed (Biot, 1956) as $$\begin{cases} \mu \nabla^2 \vec{u} + (H-\mu)\nabla \nabla \cdot \vec{u} + L\nabla \nabla \cdot \vec{w} + \omega^2(\rho \vec{u} + \rho_f \vec{w}) = 0 \\ L\nabla \nabla \vec{u} + M\nabla \nabla \cdot \vec{w} + \omega^2(\rho_f \vec{u} + \rho_c \vec{w}) - \frac{j\omega\eta}{\kappa}\vec{w} = 0 \end{cases} \quad (7)$$

where $\vec{u}$ is the displacement vector of the solid matrix, $\vec{w}$ is the permeable displacement vector of the pore-fluid defined as $\vec{w} = F(\vec{u}_f - \vec{u})$ with $\vec{u}_f$ as the pore-fluid displacement vector; F and κ are the porosity and permeability of the matrix, respectively; η and $\rho_f$ are the viscosity and density of the pore fluid, and other parameters in equations (7) are given by $\rho = \rho_s(1-F) + \rho_f F$, $\alpha = 1 - k_b/k_s$, $L = \alpha M$, $H = \alpha L + k_b + 4\mu/3$, $1/M = F/k_f + (\alpha - F)/k_s$, where $\rho_s$ is the density of the grain, $\rho_c$ is coupling mass, $k_s$, $k_b$ and $k_f$ are the bulk Modula of the grain, the matrix and the pore-fluid, respectively; μ is the shear modulus of the dry matrix. The symbols ∇ and ● in equations (7) stand for Laplace's gradient operator and the dot-product between two vectors, respectively; ω is angular frequency and $j = \sqrt{-1}$. The total stress tensor τ and the pore-fluid pressure $P_f$ associated with equations (7) are $$\tau = [(H-\mu)\nabla \cdot \vec{u} + L\nabla \cdot \vec{w}]I + \mu(\nabla \vec{u} + (\nabla \vec{u})^*) \quad (8)$$

and $$-P_f = L\nabla \cdot \vec{u} + M\nabla \cdot \vec{w} \quad (9)$$

where I is the unit tensor and "*" stands for the transpose of a matrix. To solve equations (7) above, $\vec{u}$ and $\vec{w}$ can be expressed as $$\vec{u} = \nabla \phi_u + \nabla \times \nabla \times (\psi_u \vec{e}_z) \quad (10)$$

and $$\vec{w} = \nabla \phi_w + \nabla \times \nabla \times (\psi_w \vec{e}_z) \quad (11)$$

where $\phi_u$ and $\phi_w$, $\psi_u$ and $\psi_w$ are the displacement potentials corresponding to P wave, SV wave and SH wave, respectively; $\vec{e}_z$ is the unit vector in the axial direction. The subscripts "u" and "w" indicate the displacement potentials associated with the motion of the solid matrix and the motion of the pore fluid relative to the solid matrix, respectively. Substituting equations (10-11) into equations (7), one obtains the equations of the displacement potentials for porous media. For compressional potentials, the result is:

$$\begin{cases} H\nabla^2 \varphi_u + L\nabla^2 \varphi_w + \omega^2 \rho \varphi_u + \omega^2 \rho_f \varphi_w = 0 \\ L\nabla^2 \varphi_u + M\nabla^2 \varphi_w + \omega^2 \rho_f \varphi_u + \omega^2 \rho_c \varphi_w - \frac{i\omega\eta}{\kappa}\varphi_w = 0 \end{cases} \quad (12)$$

and for shear potentials, the result is:

$$\begin{cases} \mu_b \nabla^2 \psi_u + \omega^2(\rho\psi_u + \rho_f \psi_w) = 0 \\ \omega^2(\rho_f \psi_u + \rho_c \psi_w) - \frac{i\omega\eta}{\kappa}\psi_w = 0 \end{cases} \quad (13)$$

It can be seen from the above equations that the compressional and shear potentials can be separated like the elastic case, and the potentials $\psi_u$ and $\psi_w$ are linearly related. For simplicity in expression, the following definitions are made:

$C_t^2 = \mu/\rho$, $\gamma_f = \rho_f/\rho$, $\gamma_c = \rho_c/\rho$, $\omega_c = \eta/\kappa\rho$, $n_3 = \gamma_f/(\gamma_c - i\omega_c/\omega)$ $k_s^2 = \frac{\omega^2}{C_t^2}(1 - \gamma_f n_3)$ $C_t$ is referred to as the characteristic velocity of shear wave of the porous medium or the quasi-static approximation of shear velocity. $\omega_c$ is the characteristic frequency of the porous medium. The frequency range of sonic logging is usually much below the formation characteristic frequency. $k_s$ is the wavenumber of the shear wave in a two-phase medium. Then, equations (7) can be rewritten as $$\begin{cases} \nabla^2 \psi_u + k_s^2 \psi_u = 0 \\ \psi_w = -n_3 \psi_u \end{cases} \quad (14)$$

In this model, the porous medium is the outermost layer in which there are no incoming waves. So the general solution of the above equations can be written as $$\psi_u^{(3)} = F^{(3)} K_0(k_2 r) \quad (15)$$

and $$\psi_w^{(3)} = -n_3 F^{(3)} K_0(k_2 r) \quad (16)$$

where $F^{(3)}$ is an unknown coefficient and $k_2 = \sqrt{k_z^2 - k_s^2}$ is the radial wavenumber of the shear wave.

To solve the equations (12), trial solutions $\phi_u$ and $\phi_w$ are assumed:

$$\phi_u = A^{(3)} K_0(mr) \quad (17)$$

and $$\phi_w = B^{(3)} K_0(mr) \quad (18)$$

where $A^{(3)}$ and $B^{(3)}$ are unknowns and m is the unknown wavenumber of the compressional waves. Substituting the equations (17-18) into equation (12), it is straightforward to show that a condition of the existence of the non-zero $\phi_u$ and $\phi_w$ is that m must satisfy the following equation $$\begin{vmatrix} \lambda+1 & \sigma_L\lambda+\gamma_f \\ \sigma_L\lambda+\gamma_f & \sigma_M\lambda+\gamma_c-j\frac{\omega_c}{\omega} \end{vmatrix}=0 \quad (19)$$

with $$\lambda=\frac{C_d^2}{\omega^2}(m^2-k_z^2) \quad (20)$$

where $C_d^2=H/\rho$ is the characteristic velocity of the compressional wave of the porous medium, $\sigma_L=L/H$, and $\sigma_M=M/H$. It can be seen that equation (19) is quadratic with respect to m, which implies that m has two roots. It is well-known now that equations (12) imply the existence of a slow P-wave in porous media in addition to the conventional P-wave (referred to as fast P-wave). So, the general solutions of the compressional potentials $\phi_u$ and $\phi_w$, can be written as $$\phi_{iu}^{(3)}=A_i^{(3)}K_0(m_i r) \quad (21)$$

and $$\phi_{iw}^{(3)}=n_i A_i^{(3)}K_0(m_i r) \quad (22)$$

where i=1, 2 corresponding to fast and slow compressional waves, respectively, and $$n_i=-\frac{\lambda_i+1}{\gamma_f+\sigma_L\lambda_i}. \quad (23)$$

With the solutions of the compressional and shear potentials, the displacement and stress/pressure fields can be derived as follows:

$$u_r^{(3)}=\sum_{i=1}^{2}-m_i A_i^{(3)}K_1(m_i r)-k_2 F^{(3)}K_1(k_2 r) \quad (24)$$

$$u_z^{(3)}=\sum_{i=1}^{2}jk_z A_i^{(3)}K_0(m_i r)+jk_z F^{(3)}K_0(k_2 r) \quad (25)$$

$$W_r^{(3)}=\sum_{i=1}^{2}-n_i m_i A_i^{(3)}K_1(m_i r)-n_3 k_2 F^{(3)}K_1(k_2 r) \quad (26)$$
$$W_z^{(3)}=\sum_{i=1}^{2}n_i jk_z A_i^{(3)}K_0(m_i r)+n_3 jk_z F^{(3)}K_0(k_2 r) \quad (27)$$

$$e=\frac{\partial u_r^{(3)}}{\partial r}+\frac{\partial u_z^{(3)}}{\partial z}$$
$$=\sum_{i=1}^{2}A_i^{(3)}n_i\left[(m_i^2-k_z^2)K_0(m_i r)+\frac{m_i}{r}K_1(m_i r)\right]+$$
$$F^{(3)}\left[(k_2^2-k_z^2)K_0(k_2 r)+\frac{k_2}{r}K_1(k_2 r)\right]$$

$$\xi=-\left(\frac{\partial W_r^{(3)}}{\partial r}+\frac{\partial W_z^{(3)}}{\partial z}\right)$$
$$=-\sum_{i=1}^{2}\left\{A_i^{(3)}n_i\left[(m_i^2-k_z^2)K_0(m_i r)+\frac{m_i}{r}K_1(m_i r)\right]\right\}-$$
$$F^{(3)}n_3\left[(k_2^2-k_z^2)K_0(k_2 r)+\frac{k_2}{r}K_1(k_2 r)\right]$$

$$\frac{\partial u_r^{(1)}}{\partial r}=$$
$$\sum_{i=1}^{2}A_i^{(3)}\left[m_i^2 K_0(m_i r)+\frac{m_i}{r}K_1(m_i r)\right]++F^{(3)}\left[k_2^2 K_0(k_2 r)+\frac{k_2}{r}K_1(k_2 r)\right]$$

-continued $$\tau_{rr}=2\mu\frac{\partial u_r^{(3)}}{\partial r}+(H-2\mu)e-L\xi \quad (28)$$
$$=\sum_{i=1}^{2}A_i^{(3)}\left\{(H+Ln_i)\left[(m_i^2-k_z^2)K_0(m_i r)+\frac{m_i}{r}K_1(m_i r)\right]+\right.$$
$$2\mu k_z^2 K_0(m_i r)\}+F^{(3)}\left\{(H+Ln_3)\left[(k_2^2-k_z^2)K_0(k_2 r)+\frac{k_2}{r}K_1(k_2 r)\right]+\right.$$
$$2\mu_b k_z^2 K_0(k_2 r)\}$$

$$\tau_{rz}=\mu\left(\frac{\partial u_z^{(3)}}{\partial r}+\frac{\partial u_r^{(3)}}{\partial z}\right) \quad (29)$$
$$=2\mu\left\{-jk_z\left[\sum_{i=1}^{2}m_i A_i^{(3)}K_1(m_i r)+k_2 F^{(3)}K_1(k_2 r)\right]\right\}$$

$$-P_f^{(3)}=Le-M\xi \quad (30)$$
$$=\sum_{i=1}^{2}A_i^{(3)}(L+Mn_i)\left[(m_i^2-k_z^2)K_0(m_i r)+\frac{m_i}{r}K_1(m_i r)\right]+$$
$$F^{(3)}(L+Mn_3)\left[(k_2^2-k_z^2)K_0(k_2 r)+\frac{k_2}{r}K_1(k_2 r)\right]$$

Displacement and Stress/Pressure Continuity Conditions

The continuity conditions at the interface between borehole mud and mud cake ($r=r_1$) are 1) normal displacements in borehole fluid and mud cake sides, 2) fluid pressure in borehole fluid side and normal stress in mud cake side, and 3) tangential stress in mud cake side equal to zero, or $$\begin{cases} u_r^{(1)}=u_r^{(2)} \\ -P_f^{(1)}=\tau_{rr}^{(2)} \\ 0=\tau_{rz}^{(2)} \end{cases} \quad (31)$$

The continuity conditions at the interface between mud cake and formation ($r=r_2$) are 1) normal and tangential displacements in mud cake and formation sides, 2) normal and tangential stresses in mud cake and formation sides, and 3) the pore pressure in formation side equal to normal stress in mud cake, or $$\begin{cases} u_r^{(2)}=u_r^{(3)}+w_r^{(3)} \\ u_z^{(2)}=u_z^{(3)} \\ \tau_{rr}^{(2)}=\tau_{rr}^{(3)} \\ \tau_{rr}^{(2)}=-P_f^{(3)} \\ \tau_{rz}^{(2)}=\tau_{rz}^{(3)} \end{cases} \quad (32)$$

Integrating boundary conditions (31) and (32), an 8×8 simultaneously linear equation system will be formed. The corresponding periodic equation can be symbolically expressed by $$D_{8\times 8}(\omega,k,V_m,\rho_m,Q_M,\alpha_{MC},\beta_{MC},\rho_{MC},\alpha,\beta,\rho,F,\kappa,Q_S,V_f,\rho_f,\eta,r_0,r_1,r_2,M_T)=0 \quad (33)$$

where $\omega$ is angular frequency, k is radial wavenumber, F and $\kappa$ are porosity and permeability, $V_f$, $\rho_f$ and $\eta$ are pore-fluid velocity, density, and viscosity, respectively; $\alpha$, $\beta$ and $\rho$ are measured P and S-wave velocities and overall density, respectively; $Q_M$ and $Q_S$ are the quality factors of borehole mud and formation shear wave. For a given frequency ω, there are a number of values of wave number k that are roots, i.e., satisfy periodic equation (33).

Stoneley-Wave Dispersion and Attenuation

The Stoneley wave is the fundamental borehole mode associated with the root of the period equation (33) with a phase velocity less than the formation shear-wave velocity and borehole mud velocity. The Stoneley mode is an interface mode and its amplitude decreases exponentially with distance from the borehole interface. In perfectly elastic media, the Stoneley-wave root is real and it has no attenuation, while in poro-elastic media Stoneley-wave root is complex. The real part of the root determines Stoneley-wave phase velocity ($V_{ST}$) and the ratio of the imaginary part to the real part of the root determines Stoneley-wave attenuation ($1/2Q_{ST}$). That is, $$V_{ST}(\omega) = \frac{\omega}{\text{Re}(k_{ST})} \quad (34)$$

and $$\alpha(\omega) = \frac{1}{Q_{ST}(\omega)} = 2\frac{\text{Im}(k_{ST})}{\text{Re}(k_{ST})} \quad (35)$$

where $k_{ST}$ denotes the Stoneley-wave root for a given frequency.

REFERENCES

Burns and Cheng, (1986) "Determination of in-situ permeability from tube wave velocity and attenuation," the SPWLA 27th Annual Logging Symposium, Paper KK.

Cassell et al., (1994) "Permeability prediction based on anelastic attenuation using dipole and low frequency monopole sources in a Carbonate Reservoir in Saudi Arabia," presented at the CEO-94 Middle East Geoscience Exhibition & Conference, Bahrain, April 25-27.

Cheng, et al., (1987) "Effects of in-situ permeability on propagation of Stoneley waves in a borehole", Geophysics 52, 1279-1289.

Chin, (2001) "Method and apparatus for evaluating Stoneley waves, and for determining formation parameters in response thereto," U.S. Pat. No. 6,327,538 B1.

Gassmann, F., (1951) "Uber Die Elastizitat Poroser Medien," Vierteljahrsschr. Naturforsch. Ges., Zurich, 96, 1-23.

Hornby, (1989) "Method for determining formation permeability by comparing measured tube waves with formation and borehole parameters", U.S. Pat. No. 4,797,859.

Hsui, et al. (1985) "Tube wave attenuation and in-situ permeability," the SPWLA 26th Annual Logging Symposium, Paper CC.

Liu and Cheung, (1990) "Method for determining fluid mobility characteristics of earth formations", U.S. Pat. No. 4,964,101.

Liu and Johnson, (1997) "Effects of an elastic membrane on tube waves in permeable formations," J. Acoust. Soc. Am. 101, 3322-3329.

Rosenbaum, (1974) "Synthetic microseismograms—logging in a porous formation," Geophysics 39, 14-32.

Schmitt, (1988) "Effects of radial layering when logging in saturated porous formations," J. Acoust. Soc. Am. 84, 2200-2214.

Tang, et al. (1991) "Dynamic permeability and borehole Stoneley waves: A simplified Biot-Rosenbaum model," J. Acoust. Soc. Am. 90, 1632-1646.

Tang, et al., (1998) "Method for estimating permeability of earth formations by processing Stoneley waves from an acoustic wellbore logging instrument," U.S. Pat. No. 5,784,333.

Tang and Cheng, (2004) Quantitative borehole acoustic methods, Elsevier.

Tang, X. (2003) Determining formation shear-wave transverse isotropy from borehole Stoneley-wave measurements, Geophysics 68(1), 118-126.

White, (1983) Underground sound: Application of seismic waves, Elsevier, Amsterdam.

Winkler, et al., (1989) "Permeability and borehole Stoneley waves: Comparison between experiment and theory," Geophysics 54, 66-75.

Wood, (1944) A Textbook of Sound, Bell, London.

The invention claimed is:

1. A method for determining the permeability of a subsurface formation from sonic log data and well log data obtained from a well penetrating the formation, comprising:

(a) analyzing the sonic data to extract frequency-dependent Stoneley wave attenuation for a selected sonic log receiver array comprising at least two receivers located at different depths in the well;

(b) constructing a mathematical borehole model for the well;

(c) programming a computer to solve wave motion equations for acoustic wave propagation from the selected sonic log source location to the receiver location, said wave equations representing a central mud region surrounded by the permeable formation with an annular mud cake region in between where and if mud cake exists;

(d) determining boundary conditions from the borehole model;

(e) obtaining all constants and parameters for the wave equations from the borehole model and the well log data or by otherwise estimating, except for the formation's permeability;

(f) assuming a value for formation permeability κ;

(g) solving the wave equations to obtain a solution corresponding to a Stoneley wave;

(h) extracting from the solution a theoretical Stoneley wave attenuation as a function of frequency for the assumed value of formation permeability;

(i) obtaining experimental Stoneley wave attenuation as a function of frequency from the sonic log data, wherein the experimental Stoneley wave attenuation, $\alpha_0(\omega)$, is given by $$\alpha_0(\omega) = \frac{1}{Q_{ST}^0(\omega)} = \frac{2\tilde{\alpha}_0(\omega)V_{ST}^0(\omega)}{\omega}$$

where $Q_{ST}^0(\omega)$ is a frequency dependent quality factor, $V_{ST}^0(\omega)$ is experimental Stoneley wave velocity, ω is frequency, and $\tilde{\alpha}_0(\omega)$ is a Stoneley wave attenuation factor;

(j) comparing theoretical Stoneley wave attenuation to experimental Stonely wave attenuation; and (k) adjusting the assumed value of κ and repeating steps (g), (h), (j) and (k) until theoretical and experimental Stoneley wave attenuation values agree according to a predetermined criterion, the corresponding value of κ being a predicted value for formation permeability at a depth range corresponding to the interval covered by the selected receiver positions.

2. The method of claim 1, wherein said comparing and adjusting steps comprise minimizing an objective function.

3. The method of claim 2, wherein said objective function is $$E(\kappa) = \sum_{\omega_1}^{\omega_2} [\alpha_0(\omega_i) - \alpha(\omega_i, \kappa)]^2$$

where $\alpha_o(\omega)$ is the experimental Stoneley wave attenuation at frequency $\omega$, and $\alpha(\omega,\kappa)$ is the theoretical Stoneley wave attenuation at frequency $\omega$ and permeability $\kappa$, and the summation extends over a Stoneley wave frequency range $\omega_1$ to $\omega_2$ obtained from the sonic log data.

4. The method of claim 3, wherein convergence of said minimization is aided by using the following one-dimensional linear inverse algorithm to determine the adjusted value of $\kappa$ for a current value of $\kappa_0$:

$$\kappa = \kappa_0 - \frac{E(\kappa_0)}{\left.\frac{\partial E(\kappa)}{\partial \kappa}\right|_{\kappa_0}}.$$

5. The method of claim 1, further comprising repeating the steps of claim 1 for additional selected depth ranges, thereby producing a permeability depth profile.

6. The method of claim 1, wherein the wave motion equations for acoustic wave propagation in the formation are Biot's equations for porous media, describing solid and fluid phases and coupling between them, and a dissipation mechanism.

7. The method of claim 6, wherein Biot's equations are written as follows:

$$\begin{cases} \mu\nabla^2\vec{u} + (H-\mu)\nabla\nabla\cdot\vec{u} + L\nabla\nabla\cdot\vec{w} + \omega^2(\rho\vec{u}+\rho_f\vec{w}) = 0 \\ L\nabla\nabla\vec{u} + M\nabla\nabla\cdot\vec{w} + \omega^2(\rho_f\vec{u}+\rho_c\vec{w}) - \frac{j\omega\eta}{\kappa}\vec{w} = 0 \end{cases}$$

where $\vec{u}$ is the displacement vector of the formation's solid matrix, $\vec{w}$ is permeable displacement vector of the formation's pore-fluid defined as $\vec{w} = F(\vec{u}_f - \vec{u})$ with $\vec{u}_f$ as pore-fluid displacement vector; F and $\kappa$ are porosity and permeability of the matrix, respectively; $\eta$ and $\rho_f$ are viscosity and density of the pore fluid, and $\rho=\rho_s(1-F)+\rho_f F$, $\alpha=1-k_b/k_s$, $L=\alpha M$, $H=\alpha L+k_b+4\mu/3$, $1/M=F/k_f+(\alpha-F)/k_s$, where $\rho_s$ is the density of the grain, $\rho_c$ is coupling mass, $k_s$, $k_b$ and $k_f$ are the bulk Modula of the grain, the matrix and the pore-fluid, respectively; $\mu$ is the shear modulus of the dry matrix; symbols $\nabla$ and $\bullet$ stand for Laplace's gradient operator and vector dot product, respectively; $\omega$ is angular frequency and $j=\sqrt{-1}$.

8. The method of claim 1, wherein the solution to the wave equations are values of Stoneley wave number $k_{ST}$ for selected frequencies $\omega$, and the theoretical Stoneley wave attenuation $\alpha(\omega)$ is calculated from the equation $$\alpha(\omega) = \frac{1}{Q_{ST}(\omega)} = 2\frac{\text{Im}(k_{ST})}{\text{Re}(k_{ST})}.$$

9. The method of claim 1, further comprising a quality control step applied to the sonic log data before obtaining the experimental Stoneley wave attenuation.

10. The method of claim 1, wherein the Stoneley wave attenuation factor is given by $$\tilde{\alpha}_0(\omega) = -\frac{\sum_{i=2}^{M} z_i \ln[A(\omega, z_i)/A(\omega, z_1)]}{\sum_{i=2}^{M} z_i^2}$$

where $z_i$ is the distance between the $i^{th}$ receiver to a first receiver (located at $z_1$) and $\tilde{\alpha}_0(\omega)$ is determined by fitting the preceding expression to sonic log data from the plurality of receivers.

11. A method for determining the permeability of a subsurface formation from sonic log data and well log data obtained from a well penetrating the formation, comprising:
(a) extracting frequency-dependent Stoneley wave attenuation values from the sonic log data wherein the Stoneley wave attenuation values, $\alpha_0(\omega)$, are given by $$\alpha_0(\omega) = \frac{1}{Q_{ST}^0(\omega)} = \frac{2\tilde{\alpha}_0(\omega)V_{ST}^0(\omega)}{\omega}$$

where $Q_{ST}^0(\omega)$ is a frequency dependent quality factor, $V_{ST}^0(\omega)$ is experimental Stoneley wave velocity, $\omega$ is frequency, and $\tilde{\alpha}_0(\omega)$ is a Stoneley wave attenuation factor;
(b) constructing a simulation borehole model having parameters same as the extracted Stoneley wave attenuation values, using the well log data and full Biot theory;
(c) computing a theoretical Stoneley wave attenuation for a selected value of formation permeability; and
(d) determining formation permeability by comparing the theoretical Stoneley wave attenuation with the Stoneley wave attenuation extracted from the sonic data.

12. The method of claim 11, wherein determining formation permeability is done by adjusting the selected value of formation permeability based on the comparison of the theoretical Stoneley wave attenuation with the Stoneley wave attenuation extracted from the sonic data, and repeating steps (c)-(d) until theoretical and experimental Stoneley wave attenuation values agree according to a predetermined criterion, or other stopping point is reached.

13. The method of claim 11, wherein the Stoneley wave attenuation factor is given by $$\tilde{\alpha}_0(\omega) = -\frac{\sum_{i=2}^{M} z_i \ln[A(\omega, z_i)/A(\omega, z_1)]}{\sum_{i=2}^{M} z_i^2}$$

where $z_i$ is the distance between an $i^{th}$ sonic log receiver to a first sonic log receiver (located at $z_1$) and $\tilde{\alpha}_0(\omega)$ is determined by fitting the preceding expression to sonic log data from a plurality of sonic log receivers.

14. A method for producing hydrocarbons from a subsurface formation, comprising:
(a) obtaining sonic log data and well log data acquired from a well penetrating the formation;
(b) obtaining frequency-dependent Stoneley wave attenuation values extracted from the sonic log data wherein the Stoneley wave attenuation values, $\alpha_0(\omega)$, are given by $$\alpha_0(\omega) = \frac{1}{Q_{ST}^0(\omega)} = \frac{2\tilde{\alpha}_0(\omega)V_{ST}^0(\omega)}{\omega}$$

where $Q_{ST}^0(\omega)$ is a frequency dependent quality factor, $V_{ST}^0(\omega)$ is experimental Stoneley wave velocity, $\omega$ is frequency, and $\tilde{\alpha}_0(\omega)$ is a Stoneley wave attenuation factor;
(c) obtaining a simulation borehole model having parameters same as the extracted Stoneley wave attenuation values, constructed using the well log data and full Biot theory;
(d) obtaining formation permeability determined by comparing the Stoneley wave attenuation extracted from the sonic data with a theoretical Stoneley wave attenuation computed for a selected value of formation permeability; and
(e) producing hydrocarbons from the formation using the obtained formation permeability.

15. The method of claim 14, wherein the Stoneley wave attenuation factor is given by $$\tilde{\alpha}_0(\omega) = -\frac{\sum_{i=2}^{M} z_i \ln[A(\omega, z_i)/A(\omega, z_1)]}{\sum_{i=2}^{M} z_i^2}$$

where $z_i$ is the distance between an $i^{th}$ sonic log receiver to a first sonic log receiver (located at $z_1$) and $\tilde{\alpha}_0(\omega)$ is determined by fitting the preceding expression to sonic log data from a plurality of sonic log receivers.

* * * * *